Feb. 2, 1954     E. G. NICHOLAS     2,667,825
FOCUSING GUIDE
Filed Feb. 27, 1950
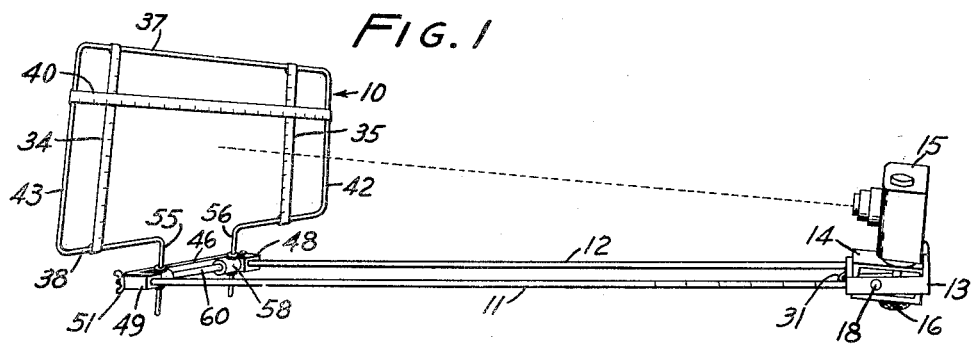
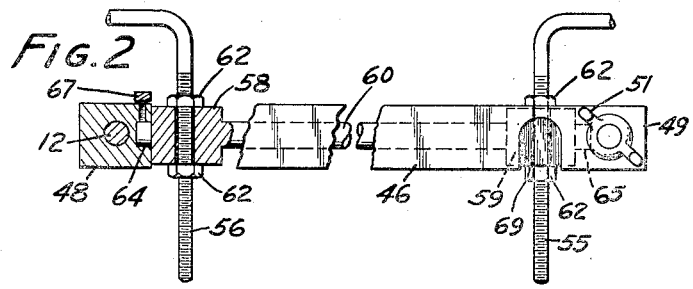
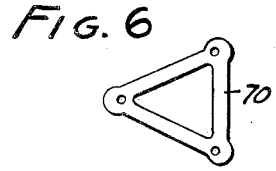
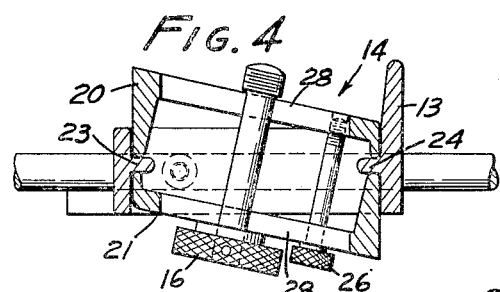
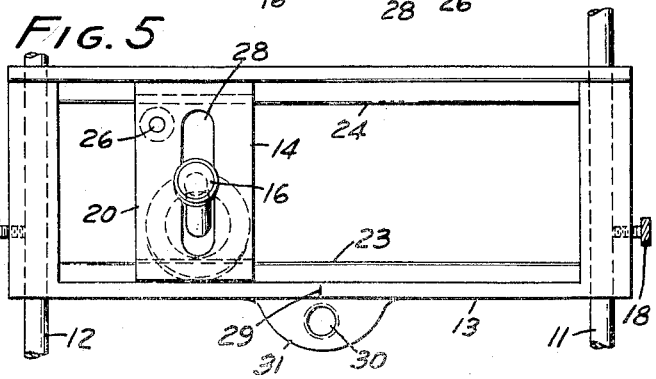
INVENTOR.
ERFORD G. NICHOLAS,
BY James C. Christie
ATTORNEY Patented Feb. 2, 1954

2,667,825

UNITED STATES PATENT OFFICE 2,667,825

FOCUSING GUIDE

Erford G. Nicholas, Pasadena, Calif.

Application February 27, 1950, Serial No. 146,449

2 Claims. (Cl. 95—11)

This invention relates to improvements in focusing guides facilitating the use of a camera in close up photography, for example in the photographing of flowers, stamps, coins, insects and other small objects at short distances.

Relatively close objects are photographically inaccessible to the ordinary camera, such as the popular 35 mm. camera designed for distant picture taking. But with the addition of a supplementary lens, the photographing of small objects at relatively short distances is possible with the ordinary camera. With some supplementary lenses the distance may be a foot or less.

Close up photography with the ordinary camera and supplementary lens has two outstanding shortcomings. First, with a field of such shallow depth, the view finder of the camera is of little or no value in framing the picture. In consequence, it is often difficult for the photographer to determine how much of the subject actually will be in the picture or its relative placement. Secondly, in close up work, knowledge of the distance of the subject from the supplementary lens is of particular importance in the focusing of the camera to obtain a clear and sharply defined picture. Too often, in close photography, an estimate of the distance of the subject is erroneous, giving a dull and poorly defined picture.

Hereinafter, the term lens is employed to denote the optic system of the camera adapted to close up photography unless indicated otherwise.

To overcome the foregoing difficulties, it has been proposed to employ a device described as a focusing guide or focal frame comprising a frame held at a distance and in a plane parallel to the lens of the camera. The frame is attached by an arm or other means to a block upon which the camera rests. In using this guide the frame is placed around the subject, thereby assuring correct framing and because the length of arm is known, the focus adjustments of the camera may be correctly set to give a sharply defined picture.

The focusing guide described above is limited in its utility to a fixed subject distance and to a frame fixed in size for a single make and size of camera.

The focusing guide of my invention is adjustable as to frame size and subject distance. Moreover, in my preferred embodiment means are provided which permit the use of the guide with different makes of cameras of the same size, say a 35 mm.

Generally speaking, in the focusing guide of my invention, I provide a camera mount and a focusing frame spaced therefrom. The frame is adjustable as to size and defines an area lying in a plane parallel to the lens of a camera affixed to the mount i. e. normal to the lens axes. Means are provided for varying the spacial relationship between the mount and the frame. Preferably, the camera mount and frame are joined by a pair of parallel runners or tracks.

In my preferred embodiment, the adjustable frame comprises a rectangular loop with three cross-members. A pair of parallel cross-members are slidably mounted at their respective opposite ends to the same opposing sides of the loop. A third cross-member is slidably mounted at its opposite ends to the opposite opposing sides of the loop.

In mounting the camera on the focusing guide it is imperative that the lens of the camera be centered with respect to the vertical center line of the frame. Nearly all of the popular makes of candid cameras have a tapped hole in their respective bases for receiving a screw of a conventional tripod mount. In the focusing guide of my invention, use is made of these tapped holes in fastening each of the respective cameras to the guide. Unfortunately the tapped holes of the several makes are not necessarily positioned at the center of their respective bases and for this reason a centrally placed camera mounting screw of the camera mount when threaded into a tapped hole does not necessarily correctly position the lens of the respective camera relative to the frame. Hence, in order to have a focusing device adapted for use with nearly all popular makes of cameras, I provide means for moving the camera mount and screw parallel to the frame in a supporting carriage to a position which gives the proper location of the camera lens with respect to the frame. The mounting screw is loosely held in a slot of the mount, thus allowing movement of the screw transversely of the mount and carriage in a plane perpendicular to the frame so as to align the screw with a tapped hole which does not lie on the longitudinal center line of the camera base.

Preferably, the focusing frame is pivotally mounted to the track, thus conveniently permitting the folding of the frame over the track when the focusing guide is not in use.

The focusing guide of my invention may be used with a tripod mount if it be desired. To this end I prefer to provide a tapped hole in the focusing guide, preferably in the carriage, for receiving the screw of the tripod mount.

For convenience of use, the frame of my focusing guide is inclined relative to the tracks or other means which connect the frame to the carriage and towards the carriage and the mount. For accurate focusing, the lens of the mounted camera must lie in a plane parallel to the plane of the frame. To accomplish this, the camera mount may be built with an inclined surface (upon which the camera rests) lying in a plane perpendicular to the plane of the frame. Or in an alternative, the carriage may be built with the inclined surface; in that event, the camera supporting surface of the mount would be parallel to the inclined surface of the carriage.

The focusing guide of my invention may be readily adapted to table top photography or the like by the employment of an adaptor leg and a bracket. In the photographing of stamps, coins, documents, etc. it is more convenient to place the subject on a table with the camera disposed above. In using the focusing guide for table top photography, the guide is placed on the table with the frame lying in a plane substantially parallel to the table top and encompassing the subject. The pair of tracks or other means for joining the frame to the camera mount support the camera above the frame. This cantilever support is unsatisfactory because the weight of the camera may pull the tracks out of position relative to the frame, with the result the lens of the camera will not lie parallel to the plane of the frame. Moreover, a camera so supported is subject to jarring. Therefore, I prefer to provide a third supporting member, the leg, which when tied adjacent its upper end to the pair of tracks by the above mentioned bracket and held in position at its lower end by the frame furnishes in conjunction with the tracks a tripod mount for the camera.

The invention may be more clearly understood from the following detailed description, taken with reference to the accompanying drawing in which:

Fig. 1 is a perspective view of a presently preferred embodiment of the focusing guide of my invention with a camera attached thereto;

Fig. 2 is a fragmentary vertical elevation, partly in section, showing in detail the pivot connection of the focusing frame to the tracks;

Fig. 3 is a vertical elevation, partly in section, of the focusing guide (shown in Fig. 1) adapted to table top photography;

Fig. 4 is a cross section of the camera mount and carriage of the apparatus illustrated in Fig. 1;

Fig. 5 is a plan view of the camera mount and carriage of the apparatus shown in Figs. 1 and 4; and Fig. 6 is a plan view of the bracket, for adapting the apparatus of Fig. 1 to table top photography.

Referring to Fig. 1, the focusing guide illustrated comprises a focusing frame 10, a pair of parallel runners or tracks 11 and 12, and a carriage 13 spaced from the frame and supporting a camera mount 14. A camera 15 is held to the mount by a knurled headed mounting screw 16.

The camera carriage (see Fig. 5) is slidably mounted on the tracks, thus permitting adjustment of the distance between the frame and the carriage. The carriage is locked to the tracks by set screws 17, 18.

As explained above, in order to have a focusing device adapted for the use with nearly all popular makes of candid cameras of the same size, it is necessary to provide a camera mount movable parallel to the focusing frame and a mounting screw carried by the mount movable parallel to the tracks. The camera mount (Figs. 4 and 5) includes a pair of slotted pieces 20, 21 slidably held to opposite sides of inwardly extending lips 23, 24 of the carriage frame by the camera mounting screw 16 and a knurled head set screw 26. The camera mounting screw is loosely held in slots 28 of the two pieces and is movable therein parallel to the tracks.

The mounting screw of the camera mount is threaded into a tapped hole in the base of the camera, and when tightened the camera is securely held to the mount and the mount in turn to the carriage by the clamping of the two pieces of the mount to the inwardly extending lips of the carriage. However, with removal of the camera and the loosening of the mounting screw, the mount is again slidable relative to the carriage and if provisions were not made for locking the camera mount in position it would be necessary with each removal of the camera to reposition the camera mount relative to the focusing frame before using the guide. To prevent this, the set screw 26 is provided and before removing the camera from the mount the screw is threaded snugly into its hole, thereby locking the mount to the carriage.

The camera is correctly positioned when the center of its lens is in alignment with mark 29 of the carriage.

The focusing frame is inclined toward the camera mount at an angle of about 12° relative to a perpendicular plane cutting the tracks. It is imperative for accurate focusing that the plane of the frame lie parallel to the lens of the camera. To accomplish this, the camera mount as shown in Fig. 4 is built with an upper inclined surface lying in a plane perpendicular to the plane of the frame. In other words, this camera supporting surface of the mount forms an angle of about 12° with the tracks. As recited above, in an alternative, the inclined surface may, if desired, be built into the carriage rather than the camera mount. In either case, the camera would be supported with its lens parallel to the plane of the frame.

Referring to Fig. 1, the focusing frame comprises a rectangular loop 33 and three scaled cross-members. A pair of parallel cross-members 34, 35 are slidably mounted at their respective opposite ends to the same opposing sides 37, 38 of the loop. A third cross-member 40 is slidably mounted at its opposite ends to the opposite opposing sides 42, 43 of the loop.

After movement of the several cross-members to frame the subject, the size of the frame or picture may be readily computed by reference to the scaled cross-members. The photographer then refers to the instructions furnished with his camera and supplementary lens to determine the proper subject distance (i. e. the distance from the supplementary lens to the focusing frame) for the particular size frame and for the lens being employed. The determined subject distance is accordingly set by loosening the set screws 17, 18 and moving the tracks relative to the carriage. One of the tracks, like the cross-members, is graduated so that the distance may be readily set. Then after setting the focusing scale of his camera and determining the proper exposure, the photographer is ready to take the picture, encompassed by the frame.

The pair of parallel tracks are spaced apart and held together adjacent the focusing frame (Figs. 1 and 2) by a tie piece 46 built integral with two blocks 48, 49 through which the tracks extend. The tracks are fastened to the blocks of the tie piece by a pair of wing nuts 51 (only one shown), screwed on the threaded ends of the track.

The focusing frame is pivotally mounted to the pair of tracks by a cross piece 60, thus permitting the folding of the frame over the track. Two threaded legs 55, 56 of the frame extend through swollen sections 58, 59 of the cross piece and are adjustably held thereto by several nuts 62. By use of these nuts the frame may be lowered if the field covered by the mounted camera is of such size as to include the bottom of the frame in the picture. Stub ends 64, 65 of the cross piece are pivotally journalled in the blocks of the tie pieces. The frame and its supporting cross piece are locked in position relative to the tracks by a set screw 67 which passes through the block 48 and abuts against the corresponding journalled stubshaft. With the folding of the frame over the track, the legs of the frame pass through slots 69 (only one shown) of the tie piece.

The focusing guide is fastened to a conventional tripod mount by threading the screw of a tripod (not shown) into a tapped hole 30 of a protrusion 31 (Fig. 5) of the camera carriage. In an alternative embodiment (not illustrated), the knurled head of the camera mounting screw is provided with a threaded hole adapted to receive the tripod screw.

In Fig. 3 the focusing guide of the invention is shown adapted to table top photography. For table top photography, the guide is placed on the table with the focusing frame lying in a position substantially parallel to the table top and the camera supported thereabove. An adaptor leg 71, held in position at its lower end by engagement with an inside edge of the focusing frame, is tied by a bracket 70 (see Fig. 6) adjacent its upper end to the pair of tracks.

The focusing guide herein described and illustrated leaves the photographer free to concentrate on his subject with the assurance that the subject will be correctly framed in the picture. The guide eliminates the common trouble of parallax and the operator when using this guide need only concern himself with the proper exposure.

I claim:

1. In a close focusing guide for use with a camera, the combination comprising a pair of parallel runners lying in a single plane, a frame hinge mounted on the front of the runners to swing transverse to the axis of the runners, a focal frame supported by said hinge, means for locking the frame in erect position rearwardly inclined with respect to the plane of said runners, first and second cross members slidably mounted on the frame in parallel alignment, a third cross member slidably mounted on the frame transversely of the first and second cross members, said members and frame adjustably defining the boundaries of the area to be photographed, a carriage slidably mounted on the runners and having a pair of parallel lips with an opening therebetween extending perpendicularly with respect to the runners, a pair of brackets respectively engaging the opposite sides of said lips and having surfaces which are inclined with respect to the plane of the parallel runners so that the surfaces are disposed perpendicularly with respect to the plane of the focal frame in locked position, the brackets having aligned slots therein which extend parallel to the runners, and a camera mounting screw extending through said slots.

2. Apparatus according to claim 1 including a bracket having a pair of apertures through which the runners extend and a leg at one end engaging the bracket at a point spaced from said apertures, and at the other end engaging the frame at the side thereof opposite the runners.

ERFORD G. NICHOLAS.

References Cited in the file of this patent

UNITED STATES PATENTS

| Number | Name | Date |
| --- | --- | --- |
| 1,401,591 | Doggett | Dec. 27, 1921 |
| 1,837,704 | Dean | Dec. 22, 1931 |
| 2,172,348 | Githens et al. | Sept. 12, 1939 |
| 2,237,730 | Fassin | Apr. 8, 1941 |
| 2,256,894 | Chadkin | Sept. 23, 1941 |
| 2,277,448 | Munsinger | Mar. 24, 1942 |
| 2,403,892 | McFarlane et al. | July 9, 1946 |
| 2,466,171 | Hencke et al. | Apr. 5, 1949 |
| 2,483,482 | Strobel | Oct. 4, 1949 |
| 2,505,990 | Pollock | May 2, 1950 |

FOREIGN PATENTS

| Number | Country | Date |
| --- | --- | --- |
| 668,689 | France | July 16, 1929 |
| 566,122 | Germany | Dec. 10, 1932 |

OTHER REFERENCES

Popular Photography, vol. 22, #6, June 1948, pages 186 and 187. Published in Chicago, Ill. (Copy of pages 186 and 187 in 95/11.)